US007886458B2

(12) United States Patent
Blair

(10) Patent No.: US 7,886,458 B2
(45) Date of Patent: Feb. 15, 2011

(54) LINT COLLECTION APPARATUS AND SYSTEM FOR FABRIC DRYERS

(75) Inventor: Ryan Blair, Syracuse, NY (US)

(73) Assignee: G.A. Braun Inc., Syracuse, NY (US)

( * ) Notice: Subject to any disclaimer, the term of this patent is extended or adjusted under 35 U.S.C. 154(b) by 326 days.

(21) Appl. No.: 11/615,073

(22) Filed: Dec. 22, 2006

(65) Prior Publication Data

US 2008/0148943 A1 Jun. 26, 2008

(51) Int. Cl.
*F26B 11/02* (2006.01)

(52) U.S. Cl. ............................... 34/83; 34/609; 34/628; 34/74; 68/20; 15/308; 134/25.1; 432/68

(58) Field of Classification Search ............. 34/83, 34/609, 628, 74; 68/20; 15/308; 134/25.1; 432/68
See application file for complete search history.

(56) References Cited

U.S. PATENT DOCUMENTS

| | | | | | |
|---|---|---|---|---|---|
| 1,453,711 | A | * | 5/1923 | Hoting | 68/20 |
| 1,533,903 | A | * | 4/1925 | Rylander | 34/83 |
| 1,575,917 | A | * | 3/1926 | Hunt | 34/83 |
| 1,730,125 | A | * | 10/1929 | Craig | 34/664 |
| 1,751,681 | A | * | 3/1930 | Chase et al. | 15/308 |
| 2,027,317 | A | * | 1/1936 | Morrill | 34/646 |
| 2,152,238 | A | * | 3/1939 | Bridges | 34/649 |
| 2,160,253 | A | * | 5/1939 | Rylander | 19/90 |
| 2,310,680 | A | * | 2/1943 | Dinley | 34/74 |
| 2,372,790 | A | * | 4/1945 | Morgenstern | 34/609 |
| 2,422,825 | A | * | 6/1947 | Davis, Jr. | 34/82 |
| 2,424,737 | A | * | 7/1947 | Broglie | 34/82 |
| 2,434,476 | A | * | 1/1948 | Wales | 68/19.2 |
| 2,451,206 | A | * | 10/1948 | Ellis | 34/604 |
| 2,503,329 | A | * | 4/1950 | Geldhof et al. | 34/604 |
| 2,517,421 | A | * | 8/1950 | Geldhof | 432/117 |
| 2,521,712 | A | * | 9/1950 | Geldhof | 34/82 |
| 2,539,407 | A | * | 1/1951 | Dinley | 34/74 |
| 2,546,925 | A | * | 3/1951 | Geldhof et al. | 34/82 |
| 2,547,238 | A | * | 4/1951 | Tremblay | 34/603 |
| 2,550,118 | A | * | 4/1951 | Kauffman | 34/543 |
| 2,553,581 | A | * | 5/1951 | Hatfield | 68/12.14 |
| 2,583,427 | A | * | 1/1952 | Holt | 34/628 |
| 2,608,769 | A | * | 9/1952 | O'Neil | 34/131 |
| 2,617,203 | A | * | 11/1952 | Murray | 34/82 |
| 2,633,646 | A | * | 4/1953 | Smith | 34/425 |
| 2,655,865 | A | * | 10/1953 | Geiringer | 101/407.1 |
| 2,665,500 | A | * | 1/1954 | Zehrbach | 34/82 |
| 2,681,513 | A | * | 6/1954 | Fowler | 34/82 |
| 2,707,337 | A | * | 5/1955 | Morrison | 34/139 |
| 2,707,837 | A | * | 5/1955 | Paulsen et al. | 34/607 |

(Continued)

FOREIGN PATENT DOCUMENTS

| | | | |
|---|---|---|---|
| DE | 3446356 C1 | * | 3/1986 |
| DE | 3600058 A1 | * | 7/1987 |
| DE | 3600069 | | 7/1987 |

(Continued)

*Primary Examiner*—Stephen M. Gravini
(74) *Attorney, Agent, or Firm*—George R. McGuire; Bond Schoeneck & King, PLLC

(57) ABSTRACT

A modular lint collection system for a fabric dryer, comprising a lint collection frame having a plurality of lint screen retaining members associated therewith, and a plurality of lint collection screens connected to respective lint screen retaining members and arranged in a zigzag pattern. The lint collection screens are oriented in respective vertical planes with adjacent screens lying in intersecting relation to one another, such that the air flow being drawn through the dryer generally impinges the screens at an oblique angle.

5 Claims, 11 Drawing Sheets

U.S. PATENT DOCUMENTS

| | | | | |
|---|---|---|---|---|
| 2,722,750 A | * | 11/1955 | Smith et al. | 34/82 |
| 2,722,751 A | * | 11/1955 | Weston | 34/82 |
| 2,727,315 A | * | 12/1955 | Candor | 34/543 |
| 2,728,481 A | * | 12/1955 | Robinson et al. | 220/4.02 |
| 2,741,217 A | * | 4/1956 | Speed et al. | 118/643 |
| 2,751,688 A | * | 6/1956 | Douglas | 34/82 |
| 2,776,826 A | * | 1/1957 | Bennett et al. | 432/46 |
| 2,783,549 A | * | 3/1957 | Young | 34/83 |
| 2,798,304 A | * | 7/1957 | Reiter | 34/91 |
| 2,798,306 A | * | 7/1957 | Reiter | 34/609 |
| 2,798,307 A | * | 7/1957 | Reiter | 34/610 |
| 2,802,283 A | * | 8/1957 | Strike | 34/87 |
| 2,809,025 A | * | 10/1957 | Pettyjohn | 432/68 |
| 2,809,442 A | * | 10/1957 | Glasby, Jr. | 34/82 |
| 2,814,130 A | * | 11/1957 | Cayot | 34/82 |
| 2,814,886 A | * | 12/1957 | Fowler | 34/605 |
| 2,817,157 A | * | 12/1957 | McCormick | 34/82 |
| 2,827,276 A | * | 3/1958 | Racheter | 432/62 |
| 2,830,384 A | * | 4/1958 | Zehrbach | 34/604 |
| 2,830,385 A | * | 4/1958 | Smith | 34/601 |
| 2,843,945 A | * | 7/1958 | Whyte | 34/82 |
| 2,853,798 A | * | 9/1958 | Morrison | 34/75 |
| 2,873,539 A | * | 2/1959 | Morey | 34/597 |
| 2,875,996 A | * | 3/1959 | Hullar | 432/67 |
| 2,886,901 A | * | 5/1959 | Whyte et al. | 34/601 |
| 2,893,135 A | * | 7/1959 | Smith | 34/610 |
| 2,913,832 A | * | 11/1959 | Kaufman | 34/80 |
| 2,921,384 A | * | 1/1960 | Smith | 34/75 |
| 2,925,663 A | * | 2/1960 | Smith | 34/75 |
| 2,925,665 A | * | 2/1960 | Smith | 34/82 |
| 2,941,308 A | * | 6/1960 | Cobb et al. | 34/552 |
| 2,958,138 A | * | 11/1960 | Ashby | 34/601 |
| 2,958,139 A | * | 11/1960 | Smith | 34/604 |
| 2,958,140 A | * | 11/1960 | Smith | 34/598 |
| 2,959,867 A | * | 11/1960 | Doty | 34/82 |
| 2,964,851 A | * | 12/1960 | Stelljes et al. | 34/82 |
| 2,985,966 A | * | 5/1961 | Martin | 34/75 |
| 2,985,967 A | * | 5/1961 | Pataillot et al. | 34/608 |
| 2,986,917 A | * | 6/1961 | Smith | 68/20 |
| 3,022,580 A | * | 2/1962 | Doty | 34/60 |
| 3,027,653 A | * | 4/1962 | Long et al. | 34/86 |
| 3,029,525 A | * | 4/1962 | Pinder | 34/75 |
| 3,030,712 A | * | 4/1962 | Lambert | 34/92 |
| 3,032,887 A | * | 5/1962 | Whyte et al. | 34/524 |
| 3,040,440 A | * | 6/1962 | Mellinger et al. | 34/75 |
| 3,054,194 A | * | 9/1962 | Hayes | 34/665 |
| 3,059,345 A | * | 10/1962 | Kaufman | 34/80 |
| 3,060,593 A | * | 10/1962 | Flora et al. | 34/601 |
| 3,064,361 A | * | 11/1962 | Turner | 34/91 |
| 3,069,785 A | * | 12/1962 | Mitter et al. | 34/562 |
| 3,081,554 A | * | 3/1963 | Long | 34/543 |
| 3,085,348 A | * | 4/1963 | Adey et al. | 34/79 |
| 3,085,349 A | * | 4/1963 | Barbee | 34/89 |
| 3,102,794 A | * | 9/1963 | Arnold | 34/371 |
| 3,108,464 A | * | 10/1963 | Behrens | 68/19.2 |
| 3,121,000 A | * | 2/1964 | Hubbard | 34/75 |
| 3,173,767 A | * | 3/1965 | Perloff | 34/82 |
| 3,197,886 A | * | 8/1965 | Brame et al. | 34/90 |
| 3,263,343 A | * | 8/1966 | Loos | 34/82 |
| 3,270,436 A | * | 9/1966 | Fairgrieve | 34/131 |
| 3,304,624 A | * | 2/1967 | Czech | 34/82 |
| 3,306,596 A | * | 2/1967 | Hollowell | 432/68 |
| 3,320,678 A | * | 5/1967 | Berke | 34/82 |
| 3,320,683 A | * | 5/1967 | Worst | 34/139 |
| 3,323,224 A | * | 6/1967 | Lough et al. | 34/82 |
| 3,423,906 A | * | 1/1969 | Fried | 55/302 |
| 3,429,056 A | * | 2/1969 | Metzger | 34/601 |
| 3,471,940 A | * | 10/1969 | Smith | 34/603 |
| 3,475,831 A | * | 11/1969 | Workman | 34/82 |
| 3,551,970 A | * | 1/1971 | Cohn et al. | 26/91 |
| 3,579,851 A | * | 5/1971 | Elmy | 34/82 |
| 3,600,058 A | | 8/1971 | Kato | |
| 3,638,799 A | * | 2/1972 | Serowiecki | 210/462 |
| 3,648,381 A | * | 3/1972 | Fox | 34/82 |
| 3,718,982 A | * | 3/1973 | Deaton | 34/82 |
| 3,722,106 A | * | 3/1973 | Takeyama et al. | 34/82 |
| 3,738,031 A | | 6/1973 | Lott | |
| 3,739,486 A | * | 6/1973 | Kallenberg | 34/70 |
| 3,748,746 A | * | 7/1973 | Robandt | 34/82 |
| 3,789,514 A | * | 2/1974 | Faust et al. | 34/82 |
| 3,859,004 A | * | 1/1975 | Condit | 34/75 |
| 3,889,392 A | * | 6/1975 | Davis et al. | 34/82 |
| 3,892,048 A | * | 7/1975 | Jacobsen, Jr. | 34/604 |
| 3,955,287 A | * | 5/1976 | Brock et al. | 34/636 |
| 3,959,891 A | * | 6/1976 | Burkall | 34/82 |
| 3,960,733 A | * | 6/1976 | Van Dieren | 210/460 |
| 3,969,070 A | * | 7/1976 | Thompson | 432/105 |
| 4,011,662 A | | 3/1977 | Davis et al. | |
| 4,019,023 A | * | 4/1977 | Marzonie et al. | 219/400 |
| 4,028,817 A | | 6/1977 | Winstel | |
| 4,033,047 A | * | 7/1977 | Kawai | 34/82 |
| 4,083,537 A | | 4/1978 | Smith | |
| 4,086,053 A | * | 4/1978 | Sommer, Jr. | 432/222 |
| 4,095,349 A | | 6/1978 | Parker | |
| 4,106,214 A | | 8/1978 | Schmidt | |
| 4,122,612 A | | 10/1978 | Mrofchak | |
| 4,123,851 A | * | 11/1978 | Itoh et al. | 34/549 |
| 4,137,647 A | | 2/1979 | Clark, Jr. | |
| 4,137,649 A | * | 2/1979 | Fleissner | 34/646 |
| 4,204,338 A | * | 5/1980 | Bullock | 34/467 |
| 4,227,315 A | * | 10/1980 | Hight | 34/82 |
| 4,227,317 A | * | 10/1980 | Fleissner | 34/636 |
| 4,268,247 A | | 5/1981 | Freze | |
| 4,305,211 A | * | 12/1981 | Peterson | 34/92 |
| 4,314,409 A | * | 2/1982 | Cartier et al. | 34/82 |
| 4,326,344 A | | 4/1982 | Smith | |
| 4,338,731 A | * | 7/1982 | Shames et al. | 34/82 |
| 4,395,831 A | * | 8/1983 | Nielsen | 34/86 |
| 4,435,909 A | * | 3/1984 | Williamson, Jr. | 34/82 |
| 4,462,170 A | * | 7/1984 | Burkall et al. | 34/82 |
| 4,467,534 A | * | 8/1984 | Murase | 34/82 |
| 4,468,867 A | * | 9/1984 | Iwase | 34/82 |
| 4,507,080 A | | 3/1985 | Freze | |
| 4,514,197 A | * | 4/1985 | Armbruster | 96/138 |
| 4,550,509 A | * | 11/1985 | Murase | 34/604 |
| 4,557,058 A | * | 12/1985 | Ozawa et al. | 34/82 |
| 4,638,573 A | * | 1/1987 | Nakamura et al. | 34/82 |
| 4,653,200 A | * | 3/1987 | Werner | 34/82 |
| 4,669,199 A | * | 6/1987 | Clawson et al. | 34/82 |
| 4,689,896 A | * | 9/1987 | Narang | 34/82 |
| 4,700,492 A | * | 10/1987 | Werner et al. | 34/403 |
| 4,700,495 A | * | 10/1987 | Drews et al. | 34/603 |
| 4,702,018 A | * | 10/1987 | Hastings | 34/130 |
| 4,720,925 A | * | 1/1988 | Czech et al. | 34/82 |
| 4,726,125 A | * | 2/1988 | Pellerin | 34/82 |
| 4,793,938 A | | 12/1988 | Dayton | |
| 4,819,341 A | | 4/1989 | Gayso | |
| 4,825,560 A | * | 5/1989 | Nakamura et al. | 34/609 |
| 4,854,054 A | * | 8/1989 | Johnson | 34/603 |
| 4,899,462 A | * | 2/1990 | Putnam et al. | 34/428 |
| 4,905,381 A | * | 3/1990 | Poterala | 34/634 |
| 4,920,662 A | | 5/1990 | Seeburger | |
| 4,993,175 A | | 2/1991 | Davidson | |
| 5,077,570 A | * | 12/1991 | Schell | 396/30 |
| 5,097,606 A | * | 3/1992 | Harmelink et al. | 34/467 |
| 5,117,563 A | * | 6/1992 | Castonguay | 34/86 |
| 5,127,169 A | * | 7/1992 | Ellingson | 34/601 |
| 5,136,792 A | * | 8/1992 | Janecke | 34/78 |
| 5,157,848 A | | 10/1992 | Dongelmans | |
| 5,203,093 A | * | 4/1993 | Baker | 34/601 |
| 5,210,960 A | * | 5/1993 | LaRue | 34/82 |
| 5,259,124 A | * | 11/1993 | Poterala | 34/638 |
| 5,279,047 A | * | 1/1994 | Janecke | 34/78 |
| 5,322,015 A | | 6/1994 | Gasparrini | |

| | | | |
|---|---|---|---|
| 5,350,624 A | 9/1994 | Georger et al. | |
| 5,396,716 A * | 3/1995 | Smart et al. | 34/464 |
| 5,421,103 A * | 6/1995 | Wunderlich | 34/599 |
| 5,435,837 A | 7/1995 | Lewis et al. | |
| 5,463,820 A * | 11/1995 | La Rue | 34/235 |
| 5,466,601 A | 11/1995 | Jenkins | |
| 5,467,539 A * | 11/1995 | Hahn | 34/77 |
| 5,495,681 A | 3/1996 | Paradis | |
| 5,497,563 A * | 3/1996 | Mayfield | 34/572 |
| 5,547,422 A | 8/1996 | Seboldt | |
| 5,560,069 A | 10/1996 | Berger et al. | |
| 5,701,684 A * | 12/1997 | Johnson | 34/595 |
| 6,101,741 A * | 8/2000 | Sears | 34/417 |
| 6,230,418 B1 | 5/2001 | Gomulinski | |
| 6,305,843 B1 * | 10/2001 | Helmer | 383/41 |
| 6,370,798 B1 * | 4/2002 | Gonzalez, Sr. | 34/595 |
| 6,536,132 B2 * | 3/2003 | Helmer | 34/82 |
| 6,604,298 B2 * | 8/2003 | Tomasi et al. | 34/600 |
| 6,662,464 B2 * | 12/2003 | Treu | 34/85 |
| 6,671,977 B2 | 1/2004 | Beaumont | |
| 6,709,499 B2 * | 3/2004 | Moschutz | 96/153 |
| 6,745,496 B2 * | 6/2004 | Cassella | 34/621 |
| 6,915,593 B2 * | 7/2005 | Gruble et al. | 34/600 |
| 6,966,126 B2 * | 11/2005 | Baurmann | 34/606 |
| 6,968,632 B2 * | 11/2005 | Guinibert et al. | 34/602 |
| 6,971,186 B1 * | 12/2005 | Chin et al. | 34/82 |
| 7,007,409 B2 * | 3/2006 | Moschutz et al. | 34/602 |
| 7,020,986 B1 * | 4/2006 | Nakai et al. | 34/596 |
| 7,036,243 B2 * | 5/2006 | Doh et al. | 34/595 |
| 7,055,262 B2 * | 6/2006 | Goldberg et al. | 34/82 |
| 7,065,903 B2 * | 6/2006 | Jones et al. | 34/597 |
| 7,065,905 B2 * | 6/2006 | Guinibert et al. | 34/603 |
| 7,117,612 B2 * | 10/2006 | Slutsky et al. | 34/321 |
| 7,213,349 B1 * | 5/2007 | Brunner et al. | 34/86 |
| 7,225,562 B2 * | 6/2007 | Guinibert et al. | 34/601 |
| 7,251,906 B2 * | 8/2007 | Kajihara et al. | 34/603 |
| 7,257,905 B2 * | 8/2007 | Guinibert et al. | 34/82 |
| 7,305,775 B2 * | 12/2007 | Favret et al. | 34/82 |
| 7,334,348 B2 * | 2/2008 | Morita | 34/628 |
| 7,467,483 B2 * | 12/2008 | Guinibert et al. | 34/601 |
| 7,497,030 B2 * | 3/2009 | Belgard | 34/82 |
| 7,523,564 B2 * | 4/2009 | Doh | 34/601 |
| 7,526,879 B2 * | 5/2009 | Bae et al. | 34/596 |
| 7,559,156 B2 * | 7/2009 | Renzo | 34/595 |
| 7,591,082 B2 * | 9/2009 | Lee et al. | 34/600 |
| 7,614,162 B2 * | 11/2009 | Renzo | 34/603 |
| 2002/0023368 A1 | 2/2002 | Beaumont | |
| 2002/0108268 A1 | 8/2002 | Helmer | |
| 2003/0014880 A1 * | 1/2003 | Baurmann | 34/595 |
| 2003/0084590 A1 * | 5/2003 | Tomasi et al. | 34/595 |
| 2003/0154618 A1 | 8/2003 | Treu | |
| 2004/0045187 A1 * | 3/2004 | Curry et al. | 34/595 |
| 2004/0068889 A1 * | 4/2004 | Park et al. | 34/446 |
| 2004/0118011 A1 * | 6/2004 | Moschutz et al. | 34/595 |
| 2004/0118012 A1 * | 6/2004 | Gruble et al. | 34/595 |
| 2004/0187343 A1 | 9/2004 | Beaumont | |
| 2004/0221474 A1 | 11/2004 | Slutsky et al. | |
| 2004/0221476 A1 * | 11/2004 | Jones et al. | 34/597 |
| 2004/0226581 A1 | 11/2004 | Gardner et al. | |
| 2005/0066542 A1 * | 3/2005 | Griffiths et al. | 34/597 |
| 2005/0076535 A1 * | 4/2005 | Guinibert et al. | 34/601 |
| 2005/0115104 A1 * | 6/2005 | Guinibert et al. | 34/601 |
| 2005/0126035 A1 * | 6/2005 | Lee et al. | 34/602 |
| 2005/0132594 A1 * | 6/2005 | Doh et al. | 34/73 |
| 2005/0166420 A1 | 8/2005 | Slutsky et al. | |
| 2005/0252022 A1 * | 11/2005 | Tyau | 34/82 |
| 2006/0037213 A1 * | 2/2006 | Kajihara et al. | 34/596 |
| 2006/0085996 A1 * | 4/2006 | Hwang | 34/82 |
| 2006/0096120 A1 * | 5/2006 | Moschutz et al. | 34/600 |
| 2006/0196077 A1 * | 9/2006 | Choi | 34/602 |
| 2006/0201014 A1 * | 9/2006 | Favret et al. | 34/82 |
| 2006/0260150 A1 * | 11/2006 | Doh | 34/601 |
| 2006/0265899 A1 * | 11/2006 | Renzo | 34/603 |
| 2007/0006477 A1 * | 1/2007 | Guinibert et al. | 34/85 |
| 2007/0107250 A1 * | 5/2007 | Gassmann et al. | 34/82 |
| 2007/0107251 A1 * | 5/2007 | Goldberg et al. | 34/82 |
| 2007/0113419 A1 * | 5/2007 | Belgard | 34/82 |
| 2007/0119071 A1 * | 5/2007 | Ackermann et al. | 34/322 |
| 2007/0144028 A1 * | 6/2007 | Audet et al. | 34/82 |
| 2007/0169368 A1 * | 7/2007 | Kim | 34/82 |
| 2007/0186440 A1 * | 8/2007 | Guinibert et al. | 34/603 |
| 2007/0220776 A1 * | 9/2007 | Guinibert et al. | 34/603 |
| 2007/0227035 A1 * | 10/2007 | Leroy | 34/602 |
| 2008/0022550 A1 * | 1/2008 | Masters | 34/480 |
| 2008/0060218 A1 * | 3/2008 | Doh | 34/601 |
| 2008/0110042 A1 * | 5/2008 | Ackermann et al. | 34/487 |
| 2008/0127505 A1 * | 6/2008 | Han et al. | 34/72 |
| 2008/0127506 A1 * | 6/2008 | Han et al. | 34/235 |
| 2008/0141558 A1 * | 6/2008 | Bae et al. | 34/595 |
| 2008/0148943 A1 * | 6/2008 | Blair | 95/286 |
| 2008/0163510 A1 * | 7/2008 | Dittmar et al. | 34/108 |
| 2008/0189973 A1 * | 8/2008 | Dittmer et al. | 34/76 |
| 2008/0235978 A1 * | 10/2008 | Epstein | 34/82 |
| 2008/0271336 A1 * | 11/2008 | Doh | 34/82 |
| 2008/0282569 A1 * | 11/2008 | Roberts | 34/82 |
| 2009/0064528 A1 * | 3/2009 | Kim | 34/82 |
| 2009/0077827 A1 * | 3/2009 | Doh | 34/486 |
| 2009/0100702 A1 * | 4/2009 | Fair | 34/487 |
| 2009/0113745 A1 * | 5/2009 | Choi et al. | 34/139 |
| 2009/0133284 A1 * | 5/2009 | Belgard | 34/480 |
| 2009/0158608 A1 * | 6/2009 | Schaub et al. | 34/80 |
| 2009/0158933 A1 * | 6/2009 | Schaub | 95/282 |
| 2009/0165330 A1 * | 7/2009 | Krausch | 34/480 |
| 2009/0223077 A1 * | 9/2009 | Grunert et al. | 34/82 |
| 2009/0255145 A1 * | 10/2009 | Poy | 34/480 |

FOREIGN PATENT DOCUMENTS

| | | | |
|---|---|---|---|
| DE | 4030940 C1 * | 4/1992 | |
| EP | 0364286 A2 | 4/1990 | |
| EP | 0461898 A1 | 12/1991 | |
| GB | 2038885 | 7/1980 | |
| GB | 2131141 | 6/1984 | |
| GB | 2189876 | 11/1987 | |
| GB | 2219652 A * | 12/1989 | |
| JP | 55160244 A * | 12/1980 | |
| JP | 02255187 A * | 10/1990 | |
| JP | 02305599 A * | 12/1990 | |
| JP | 03018399 A * | 1/1991 | |
| JP | 03103296 A * | 4/1991 | |
| JP | 03168196 A * | 7/1991 | |
| JP | 03221098 A * | 9/1991 | |
| JP | 04187196 A * | 7/1992 | |
| JP | 04285599 A * | 10/1992 | |
| JP | 05015697 A * | 1/1993 | |
| JP | 05200185 A * | 8/1993 | |
| JP | 05317574 A * | 12/1993 | |
| JP | 06054986 A * | 3/1994 | |
| JP | 06098994 A * | 4/1994 | |
| JP | 06178895 A * | 6/1994 | |
| JP | 06285292 A * | 10/1994 | |
| JP | 07163793 A * | 6/1995 | |
| JP | 07171295 A * | 7/1995 | |
| JP | 09313779 A * | 12/1997 | |
| JP | 10033882 A * | 2/1998 | |
| JP | 11253695 A * | 9/1999 | |
| JP | 2000334198 A * | 12/2000 | |
| JP | 2003305293 A * | 10/2003 | |
| JP | 2005065924 A * | 3/2005 | |
| JP | 2006055381 A * | 3/2006 | |
| JP | 2006175275 A * | 7/2006 | |
| JP | 2007117328 A * | 5/2007 | |
| JP | 2008012119 A * | 1/2008 | |
| JP | 2009279081 A * | 12/2009 | |

* cited by examiner

LINT COLLECTION APPARATUS AND SYSTEM FOR FABRIC DRYERS

BACKGROUND OF THE INVENTION

1. Field of Invention

The present invention relates generally to the art of fabric dryers, and more particularly to lint collection systems employed in industrial dryers.

2. Description of the Art

Fabric dryers are well known in the art. In general, dryers include a rotating basket in which wet fabric items are loaded. A heat source and blower provide a continuous stream of heated air into the basket which results in the elimination of moisture from the fabric items. Because the fabric items often include cotton and other short strands of fibrous material that becomes disassociated from the item when stressed (heated and tumbled), to prevent damage to the blower and overheating of the dryer unit, a lint trap is incorporated somewhere along the heated air stream to collect the lint and prevent it from damaging the dryer or more catastrophically, igniting a fire within the unit.

In residential dryers, lint traps generally comprise a small screen that is easily accessible to the user of the dryer, and which can be removed and cleaned, and then placed back into the lint trap receiving slot formed in the dryer unit. In industrial dryers, or dryers that are designed to dry a much larger load (and thus heavier load) of fabrics, the lint traps have traditionally taken one of two forms: a circular screen positioned between the discharge chute and the dryer basket or a flat screen that stretches across the dryer frame between the discharge chute and the dryer basket.

Relative to each of the traditional forms of industrial lint traps, each has drawbacks that the present invention addresses. First, each of the industrial lint traps are difficult to access and clean. Each provide a single large lint collection mechanism that is in and of itself heavy, and generally fastened to a frame. Cleaning the filter results in substantial dryer down time.

Second, each generally collect lint in isolated zones of the filter instead of evenly across the entire screening mechanism. Such uneven collection of the lint results in a more turbulent air flow. The turbulent air-flow results in "hot zones" being present in certain areas of the drum (areas within the drum that are hotter than other areas), thereby resulting in inefficient drying of the items in the dryer.

Third, when certain areas of the lint trap become clogged while other areas remain unclogged, the blower operates less efficiently than it would work if the lint was evenly distributed across the trap. The less efficient operation of the blower results in higher energy consumption, and could result in earlier failure of the blower motor, and/or increased maintenance needed to be performed.

It is a primary object and advantage of the present invention to provide a lint collection system for a dryer that provides a degree of uniformity to the distribution of lint across the lint trap.

It is another object and advantage of the present invention to provide a lint collection system for a dryer that provides a degree of uniformity to the heat distribution applied within the dryer.

It is a further object and advantage of the present invention to provide a lint collection system that is easily accessed and maintained by the dryer's operator.

It is an additional object and advantage of the present invention to provide a lint collection system that automatically collects the filtered lint at the end of each cycle.

It is an additional object and advantage of the present invention to provide a lint collection system that automatically collects the filtered lint in a series of dryers at the end of a cycle.

Other objects and advantages of the present invention will in part be obvious and in part appear hereinafter.

SUMMARY OF THE INVENTION

In accordance with the foregoing objects and advantages, a basic aspect of the present invention is to provide a modular lint collection system for a fabric dryer, comprising a lint collection frame having a plurality of lint screen retaining members associated therewith, and plurality of lint collection screens connected to respective lint screen retaining members.

In another aspect of the present invention provides a lint trap device adapted for placement within a dryer unit that includes a blower that when actuated directs air predominantly along a predetermined vector. The lint trap device generally comprises a frame having a plurality of filter retaining members; a plurality of filter members each adapted for secure positioning relative to a respective one of the plurality of filter retaining members; and wherein the filter retaining members orient the plurality of filter members in respective planes that extend at oblique angles relative to the predetermined vector.

In another aspect, the present invention provides a lint trap device adapted for placement within a dryer unit, comprising a frame having a plurality of filter retaining members, a plurality of filter members adapted for positioning within a respective one of he plurality of filter retaining members, wherein adjacent ones of said plurality of filter members extend in respective planes that intersect each other.

In another aspect, the present invention provides an improved filter screen adapted for collecting lint thereon during the operation of a fabric dryer, and for incorporation into a lint trap system having a plurality of filter retaining members that include upper and lower channels. The improved filter screen generally comprises a frame that defines the periphery of the filter screen, and includes an upper frame member and a lower frame member that are adapted for being received within the upper and lower channels, respectively; and a screen that is securely attached to said frame and contained within said periphery.

In another aspect of the present invention, a lint trap system adapted for use in connection with a fabric dryer having a blower and a basket, comprises a lint trap frame defining a plurality of lint trap retaining members and is positioned between the blower and basket, a plurality of filter screens interconnected to the lint trap frame, and means for blowing lint that has collected on said plurality of filter screens off of said plurality of filter screens. In one embodiment the air blowing means comprises connecting a compressed air source to a horizontally extending air knife that reciprocally rotates about its longitudinal axis and directs air at the filter screens, while in a second embodiment the air blowing mean comprises connecting a compressed air source to a plurality of vertically extending air lines that direct air at the filter screens.

In an additional aspect of the invention, a lint collection system adapted for use in combination with a fabric dryer having a dryer basket and a blower is provided, wherein the lint collection system comprises a frame on which the dryer is adapted to be positioned; a filter assembly extending transversely across the frame; a lint trough positioned adjacent the filter assembly and in vertically aligned relation to the dryer basket; and a lint collection bin interconnected to the lint trough.

An additional aspect of the present invention is to provide a lint collection system for a fabric dryer having a blower and a drum. The lint collection system generally comprises a lint trap frame defining a plurality of lint trap retaining members and positioned between the blower and drum, a plurality of filter screens interconnected to the lint trap frame, a collection bin, and means for collecting lint from the plurality of filter screens and transporting the lint to the collection bin.

A further aspect of the present invention provides a lint collection system for use in combination with a plurality of dryers, wherein each dryer includes a lint trap frame defining a plurality of lint trap retaining members and positioned between the blower and drum, a plurality of filter screens interconnected to said lint trap frame, and a lint trough positioned to contain lint collected from the plurality of filter screens. The lint collection system generally comprises a first pipe connected to each trough that form each of the plurality of dryers, a compressed air source connected to each first pipe and adapted to produce a flow of air therein, and a second pipe fluidly connected to each of the first pipes.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
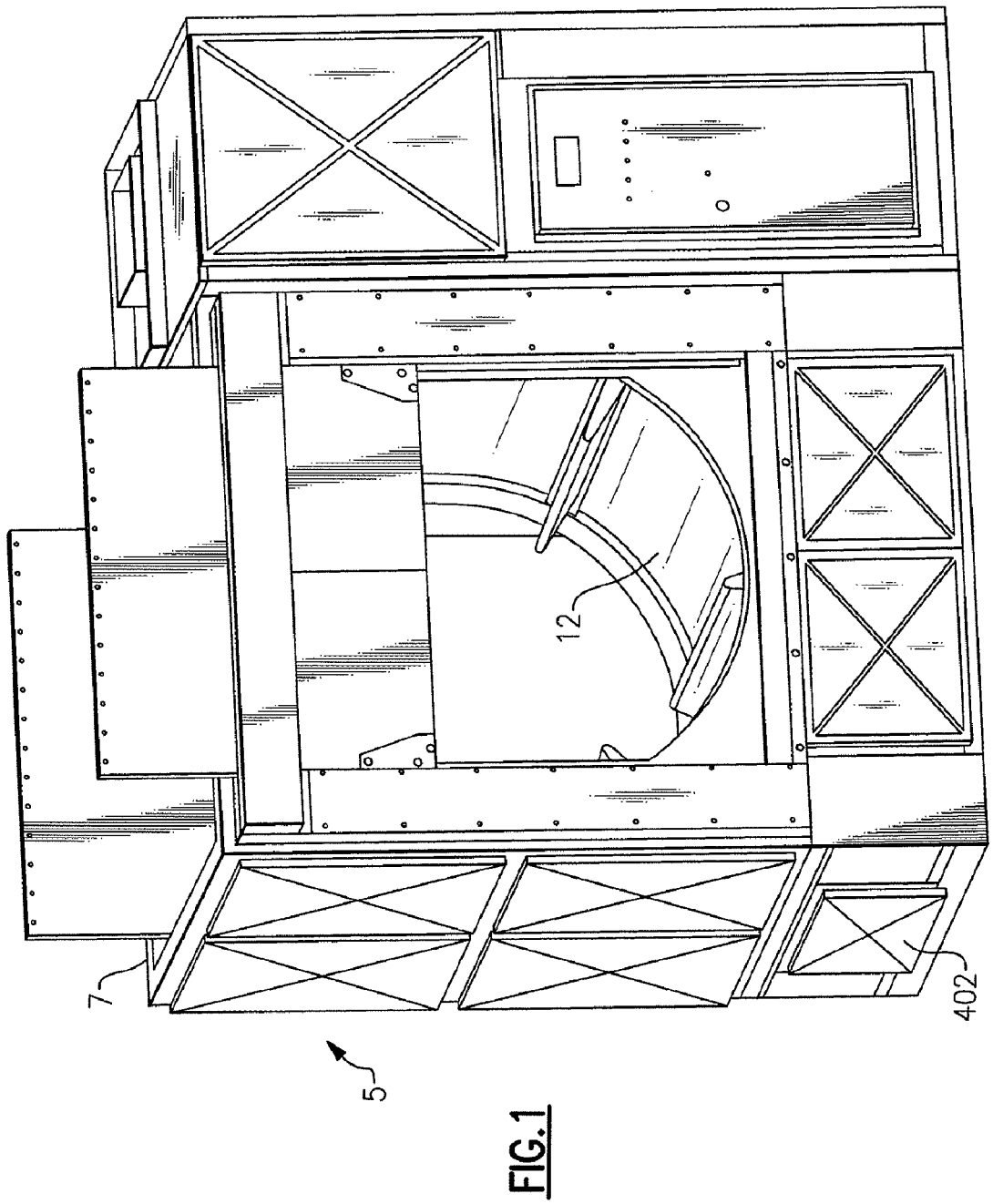
FIG. 1 is a perspective view of an industrial dryer in accordance with the present invention.
Figure 2:
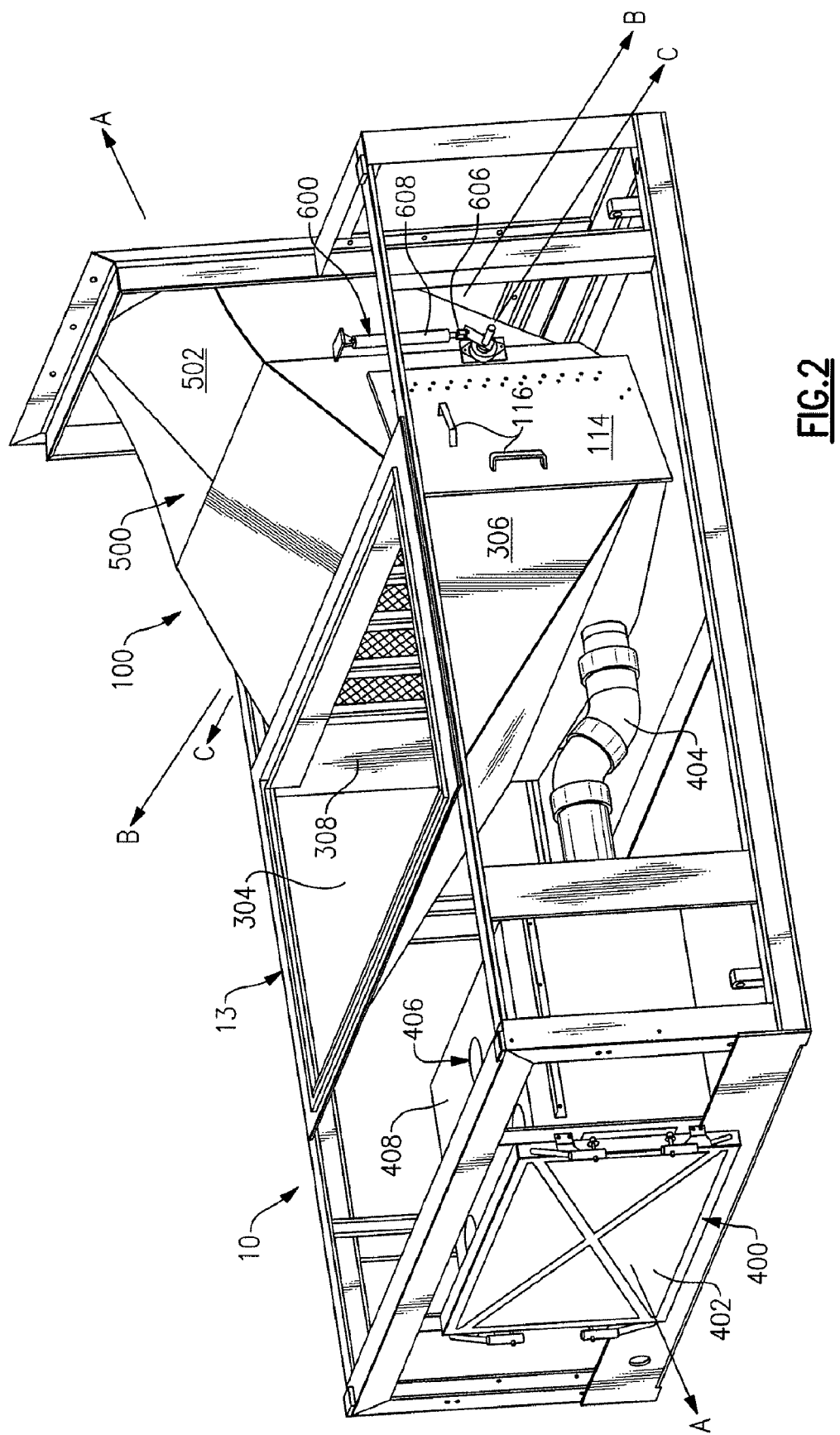
FIG. 2 is a perspective view of the lint collection system of the present invention.

Referring now to the drawings, in which like reference numerals refer to like parts throughout, there is seen in FIGS. 1 and 2 an industrial dryer 5 having a housing 7 formed there around, and a frame for the industrial dryer 5, the frame being designated generally by reference numeral 10 and extending along a longitudinal axis A-A. As will be described in greater detail hereinafter, fabric dryer basket 12 (see FIG. 1) is mounted on top of the central region 13 of frame 10 (see FIG. 2) to rotate about an axis that is transverse to axis A-A, and heated air is supplied to basket 12 and pulled therefrom by a blower/vacuum unit and into the confined area of frame 10. Before the heated air is discharged by blower/vacuum unit 14, the air must first pass through a lint collection system, designated generally by reference numeral 100. The present invention is concerned with features associated with this lint collection system 100, while the dryer itself is conventional and will therefore not be described in detail.

With reference to FIGS. 3-6, lint collection system 100 comprises a lint screen frame assembly 102 that is associated with frame 10 and in the exemplary embodiment disclosed herein, is positioned vertically below and slightly rearward of drum 12. Frame assembly 102 extends transversely across frame 10 along an axis B-B and includes an upper plate 104, a lower plate 106. Frame assembly 102 further comprises a series of vertically extending members 108 that interconnect upper and lower plates 104, 106, and a series of respective pairs of upper and lower channels 110, 112 that are mounted to upper and lower plates 104, 106, respectively. Channels 110, 112 are mounted in a zig-zag type arrangement, wherein each channel extends from an essentially common vertex V with and at an oblique angle θ relative to the adjacent channel. In other words, a series of V-shaped channels extend along the length of upper and lower plates 104, 106.

Figure 3A:
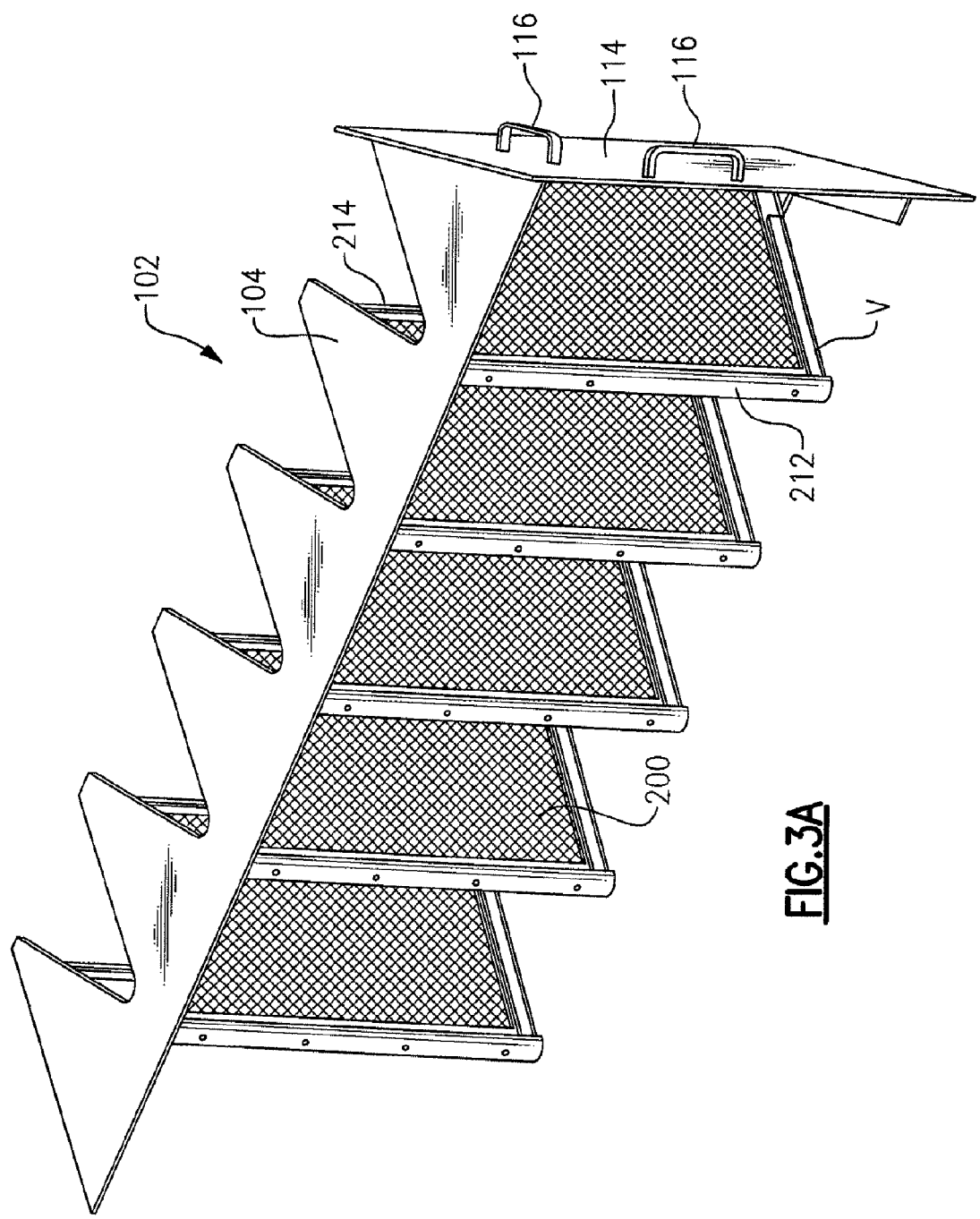
FIG. 3A is a perspective view of the lint screen frame assembly of the present invention.
Figure 3B:
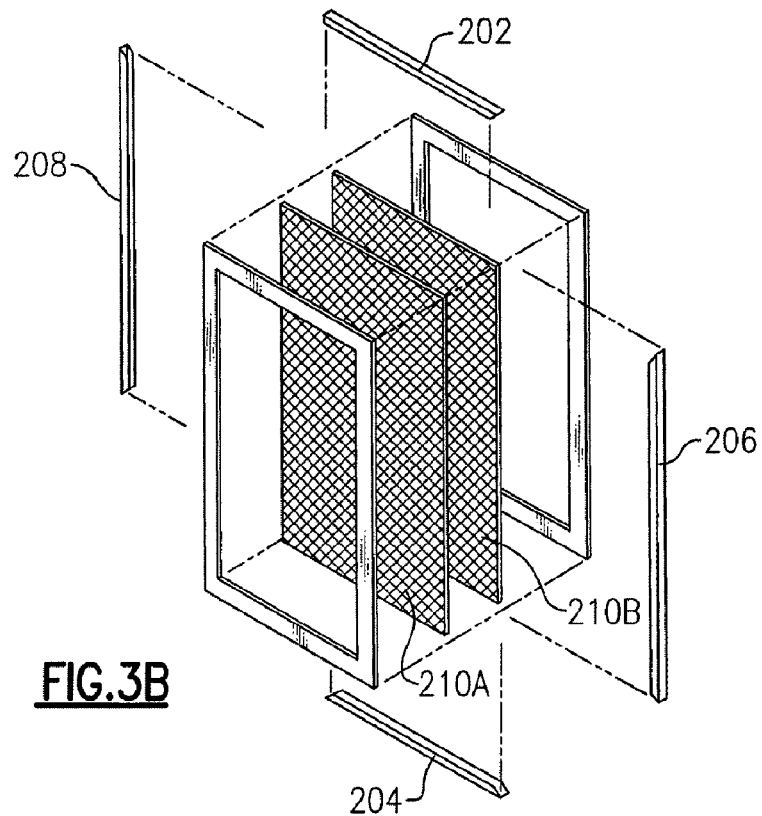
FIGS. 3B and 3C are exploded perspective views of first and second embodiments of the lint screen frame assembly, respectively.
Figure 3C:
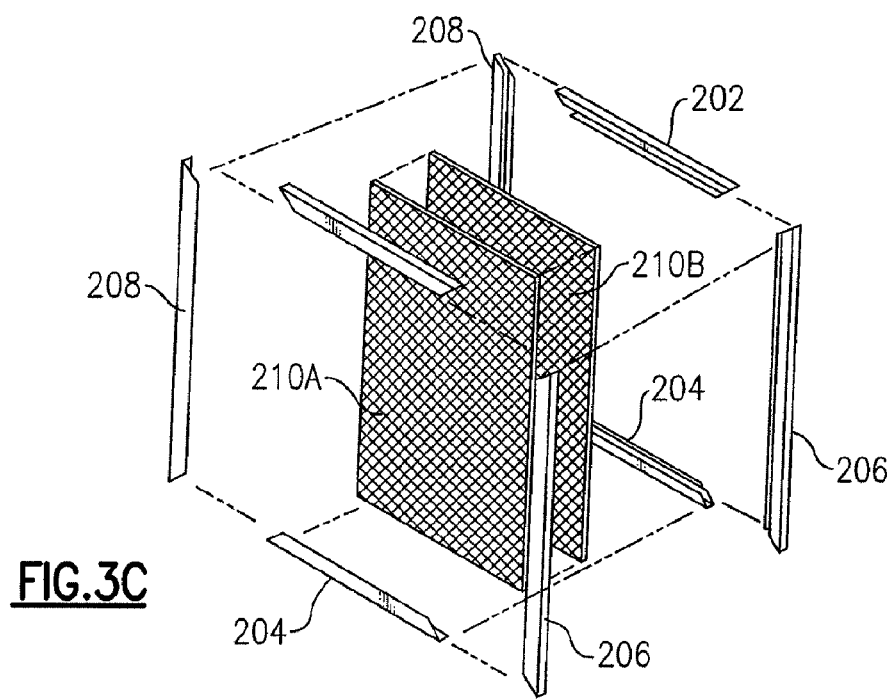
Figure 4:
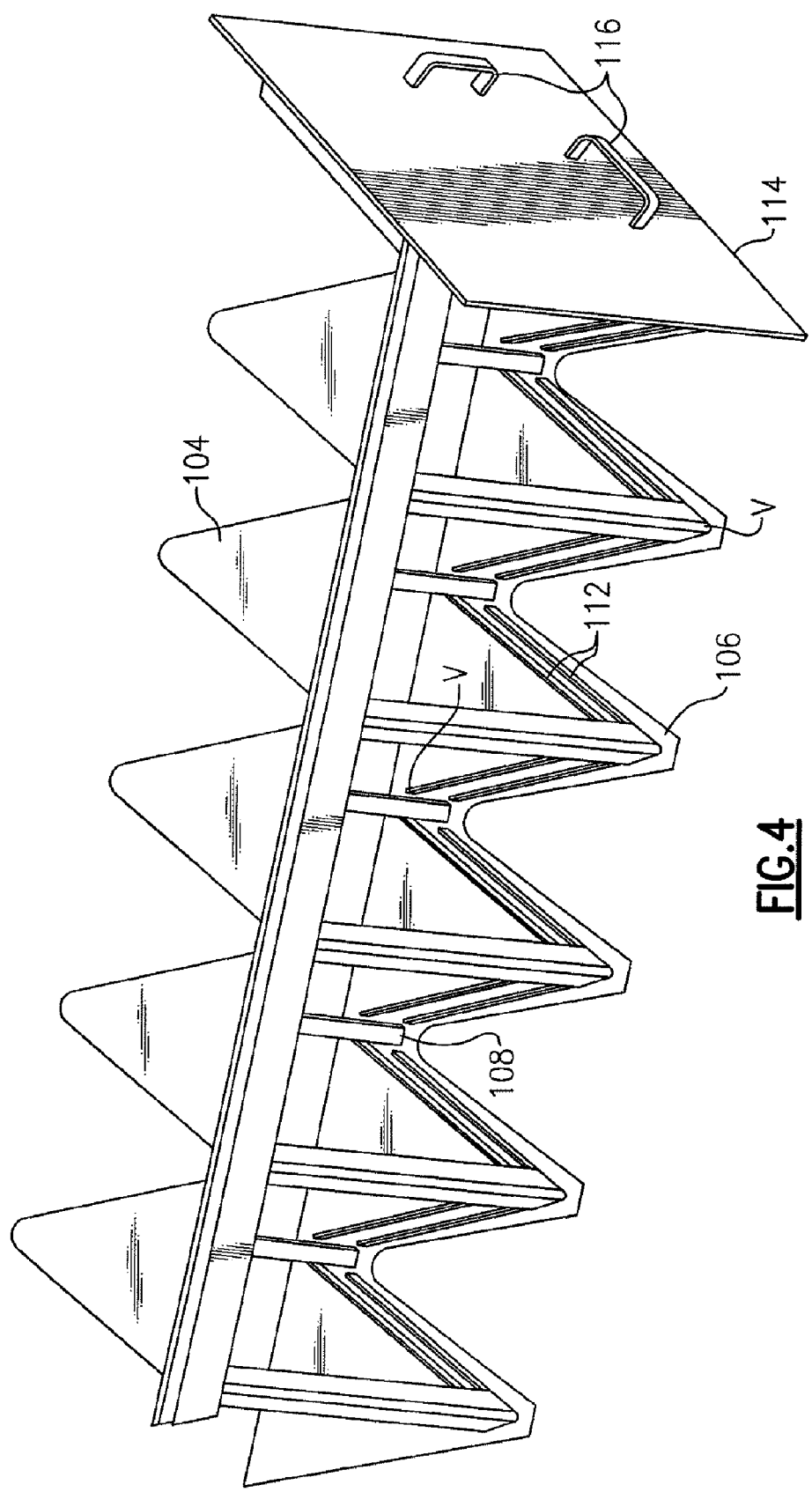
FIG. 4 is a second perspective view of the lint screen frame assembly of the present invention.
Figure 5:
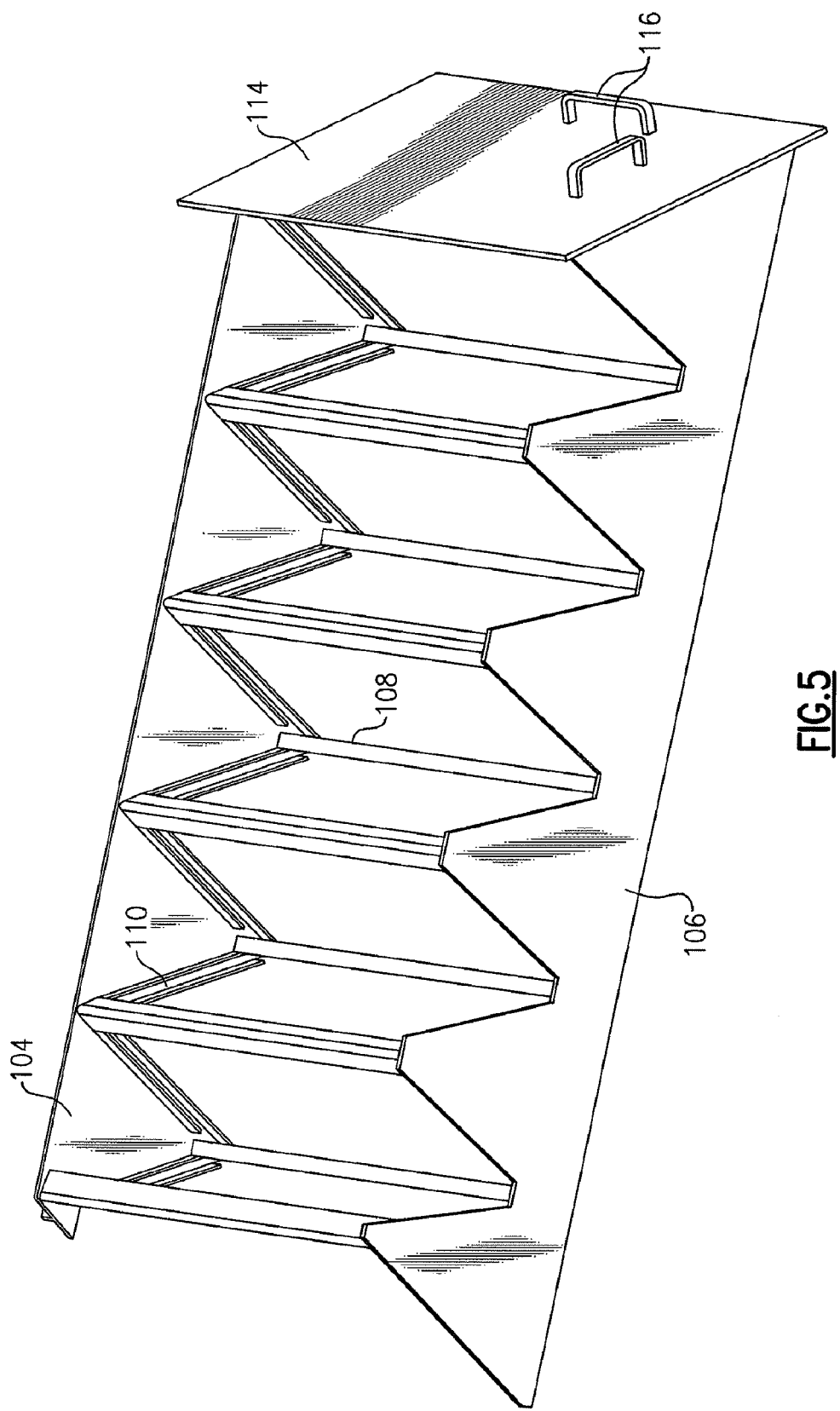
FIG. 5 is a third perspective view of the lint screen frame assembly of the present invention.
Figure 6:
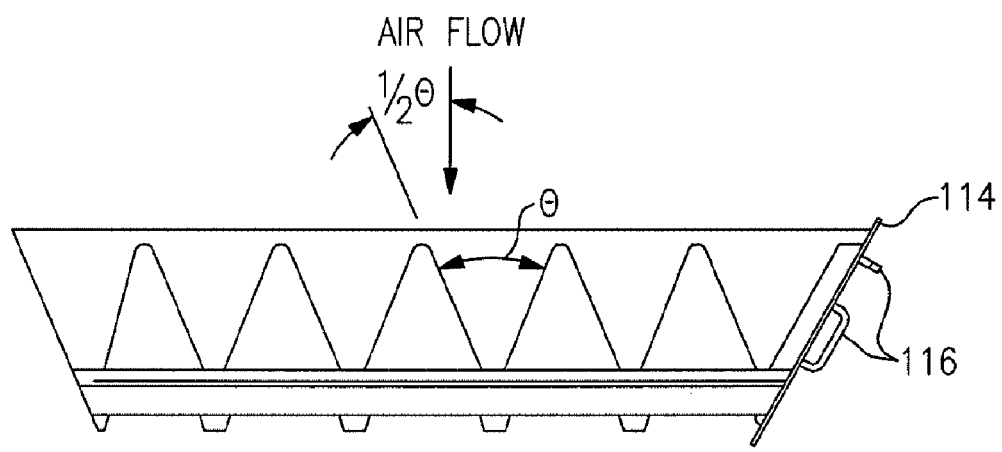
FIG. 6 is a top plan view of the lint filter screen frame assembly of the present invention.

A filter screen member 200 is provided that comprises an upper frame member 202, a lower frame member 204, and opposite side frame members 206, 208, that collectively define the periphery of a rectangular frame, and a pair of differently sized mesh screens 210A and 210B stretched between frame members 202-208. Frame members 202 are preferably molded from plastic [FIG. 3B] or extruded from aluminum (FIG. 3C). Each filter screen member 200 is slidingly positioned in lint screen frame assembly 102 with each upper frame member 202 and lower frame member 204 engaging upper channel 110 and lower channel 112, respectively. When adjacent filter screen members 200 are positioned within respective pairs of channels 110, 112, an elongated nose member 212 is fastened in covering relation along the entire length of the forward (upstream, as will be described in greater detail hereinafter) side frame member 206. Nose member 212 is preferably concave in transverse cross-section to efficiently deflect the flow of air impinging thereon during operation of the dryer. To further secure filter screen members 200 in position relative to lint screen frame assembly 102, a tail member 214 (similar to nose member 212) may be fastened along the entire lengths of rearward (downstream), adjacent side frame members 214. Thus, the plurality of filter screen members 200 attached to lint screen frame assembly 102 are arranged in vertically oriented planes, with the planes of adjacent members 200 intersecting one another at oblique angle θ. As will be appreciated from reading the remainder of this detailed description, the vector of the air flow coming from basket 12 and through lint collection system 100 impinges each screen member 200 at an oblique angle that predominantly is equal to ½ θ (thus, the force, F, at the point of impingement on screen 200 would be equal to F*cos(½ θ)). By angling the point of impingement with screen members 200, the lint present in the air flow is spread across a larger surface area of screen member 200 than when the air is normal to the screen. This partially accounts for a relatively even heat distribution and relatively uniform airflow across lint collection system 100.

One end of lint screen frame assembly 102 includes a door 114 fixed thereto. Handles 116 are fixed to the exterior surface of door 114 to permit a user to easily access and slide lint screen frame assembly 102 along axis B-B away from frame 10.

An additional feature of lint collection system 100 is a lint trough 300 that is incorporated into frame 10, within central region 13 and below basket 12. The front wall 302 of trough 300 slopes downwardly and inwardly relative to frame 10, and terminates at the upper edge of a bottom panel 312 that extends in a vertical plane just below lower pick 106. Sidewalls 304, 306 enclose the sides of trough 300 relative to frame 10, and rear walls 308, 310 extend inwardly from sidewalls 304, 306, respectively, and terminate in a common plane with nose members 212 and at the terminal sides of lint screen frame assembly 102. A floor 311 extends rearwardly from the lower edge of bottom panel 312 and beneath frame assembly 102. Floor 311 slopes inwardly from its opposing sides towards the middle thereof. Thus, all the list collected by filter screen members 200 ultimately falls to floor 311, and as will be described in greater detail hereinafter collects in the middle of floor 311.

Figure 8:
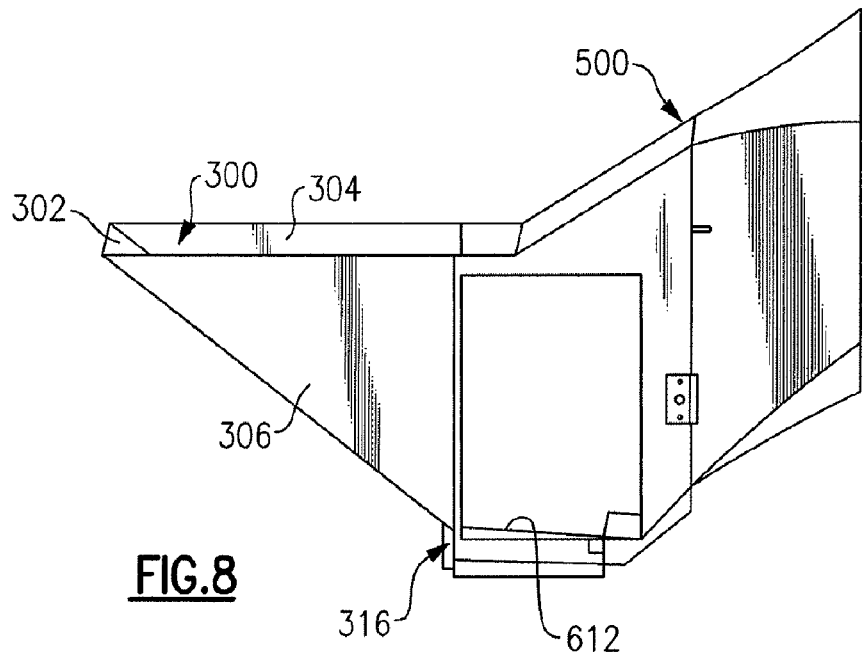
FIG. 8 is a side elevation view of the lint trough and discharge chute of the present invention.
Figure 9:
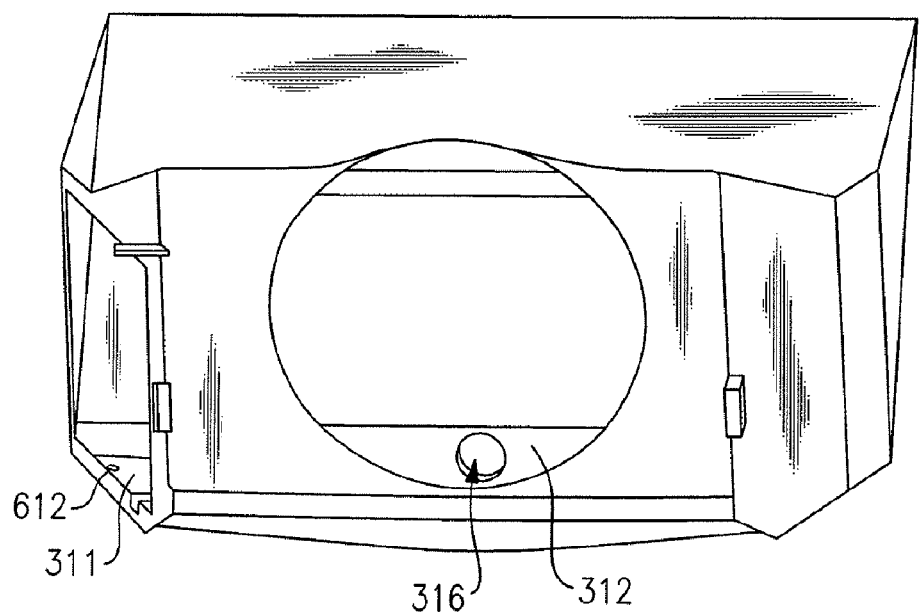
FIG. 9 is a rear elevation view of the lint trough and discharge chute of the present invention.

Trough 300 therefore defines an air deflection area that directs all air coming from basket 12 through filter screen assembly 102, and further serves as a collection bin for lint that falls (or is blown) off of screen members 200. As seen in FIGS. 8 and 9, bottom panel 312 extends upwardly from the bottom of front wall 302. An opening 316 is formed through bottom panel 312 for purposes that will be explained hereinafter.

A further feature of lint collection system 100 is a lint collection bin 400 mounted at the front end of frame 10 (although referred to as the "front" of the frame, this could be considered the "side" of the dryer itself in view of the mounting of drum to rotate about an axis transverse to axis A-A, as depicted in FIG. 1). Bin 400 includes a front access door 402 at the front end thereof that is accessible at the front of frame 10. The rear wall of bin 400 includes an opening formed therethrough and a pipe 404 and interconnects bottom section 312 of trough 300 to collection bin 400, with the terminal ends of pipe 404 sealingly engaging opening 316 and the opening formed through the rear wall of bin 400. A vacuum source fluidly connected to pipe 404 draws lint out of trough 300, through pipe 404 and into bin 400. In the preferred embodiment, pipe 404 comprises a compressed air fixture that creates a flow of air through an annular plenum that is formed into the pipe along the direction of travel; this forced compressed air stream results in a vacuum is the space immediately downstream, pulling the debris into the air stream and accelerating it through the remainder of the pipe. The Line-Vac W6087 manufactured and sold by ExAir Corporation of Cincinnati, Ohio, is an example of such a fitting, and the specifications associated therewith are hereby incorporated by reference. Finally, openings 406 are formed through the upper wall 408 to permit venting of the bin.

Figure 10:
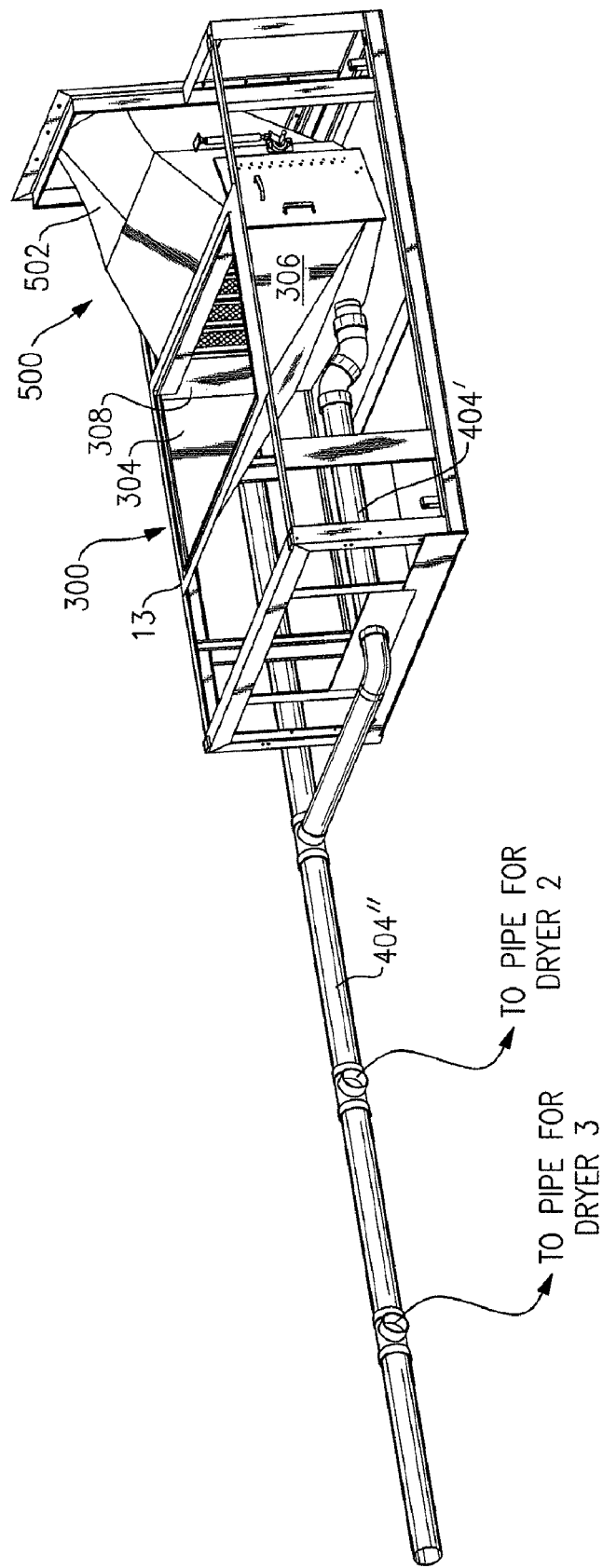
FIG. 10 is a perspective view with a schematic representation of a series of lint collecting pipes in accordance with one embodiment of the present invention.

As it is anticipated that the present invention may be incorporated into an operation in which a series of dryers are simultaneously employed, an alternate embodiment of the lint debris collection means is shown in FIG. 10 in which each dryer 5 includes a pipe 404' (with the compressed air source fitting, such as the Line-Vac fitting, as described above). Each pipe 404' is interconnected in parallel with a distribution line 404" that carries the debris to an ultimate disposal site. Such a system would minimize the dryer downtime caused by having to service the dryers for lint removal. Furthermore, by systematically removing the lint from screen members 200 at the end of each cycle (with an automated lint blow down means 600 which will be described below), and depositing the removed lint first into trough 300 and then either into bin 400 or to an ultimate collection bin that is at the terminal end of a distribution line 404", the drying process becomes more automated and more efficient, resulting in labor savings and productivity increases.

A further feature of lint collection system 100 is the discharge section 500 mounted at the rear end of frame 10 and downstream of lint screen frame assembly 102. Discharge section 500 includes a large cross-section discharge chute 502 that extends through an opening in a rear wall 504 incorporated into frame 10, and may include the blower source that draws the air flow through lint screen frame assembly 102. As depicted in FIGS. 8 and 9 trough 300 and discharge section 500 may be integrally formed with a housing 506 defined there between in which lint screen frame assembly 102 is positioned.

Mounted within discharge section 500 is a lint blowing system 600. Lint blowing system 600 uses a compressed air source that periodically blows high pressure bursts of air directly at filter screen members 200 in order to force lint collected on screen members 200 to fall from screen members 200 and into trough 300, and more particularly bottom section 312 of trough 300.

Figure 7:
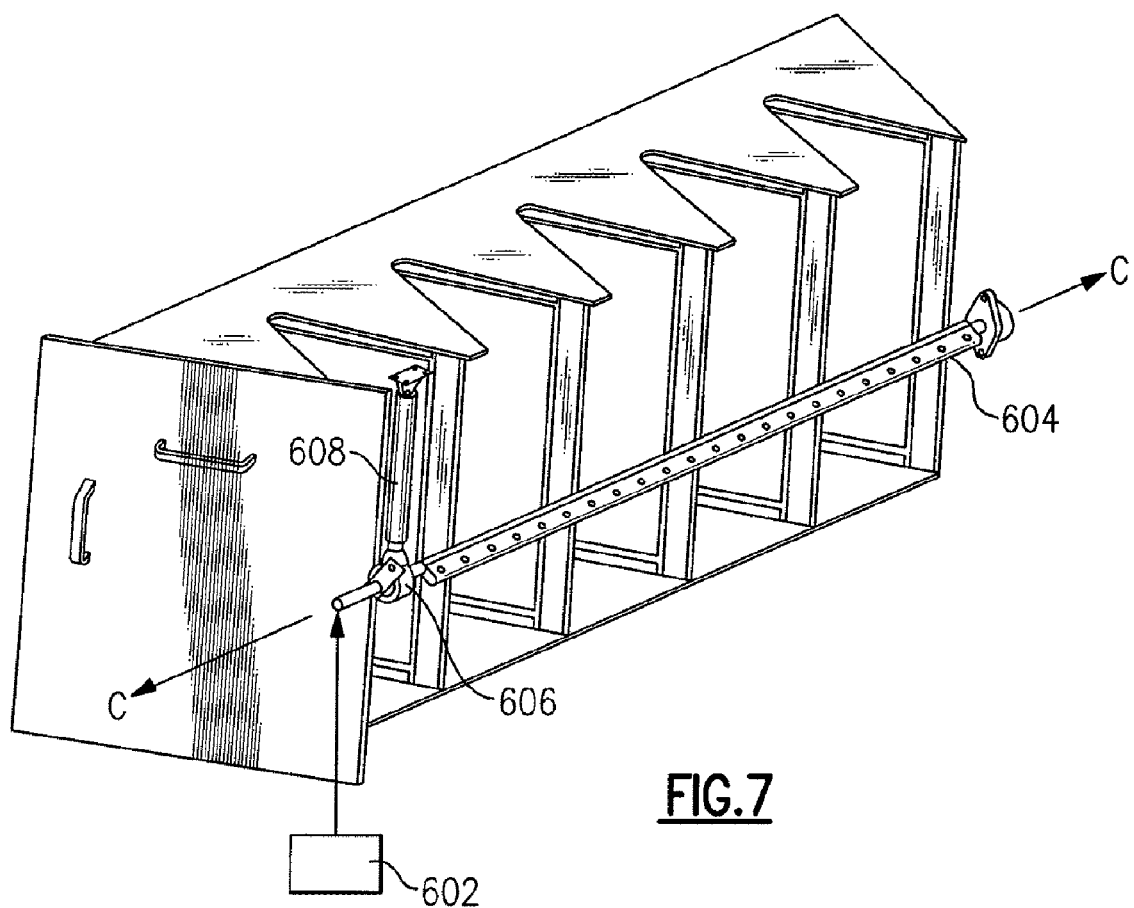
FIG. 7 is a perspective view of the lint screen frame assembly and first embodiment of a lint blowing mechanism in accordance with the present invention.

In a first embodiment of lint blower system 600 (see FIG. 7), a compressed air source 602, mounted to the exterior of discharge chute 502, is connected to an air knife 604 (such as the air knife model number 2042 manufactured by ExAir Corporation of Cincinnati, Ohio) that extends along an axis C-C that is parallel to axis B-B. Air knife 604 includes a series of air ports that discharge air therethrough along its entire length. The piston 606 of an air cylinder 608 is interconnected to air knife 604 and reciprocally rotates air knife 604 about axis C-C as it moves in and out of cylinder 608. This reciprocating rotational motion essentially produces a peeling effect to lint that has collected on screen members 200. A PLC is the preferred means for controlling the periodicity of the air blowing actuation (in addition to controlling the lint blowdown and collection that occurs at the end of each dryer cycle as described above).

Figure 11:
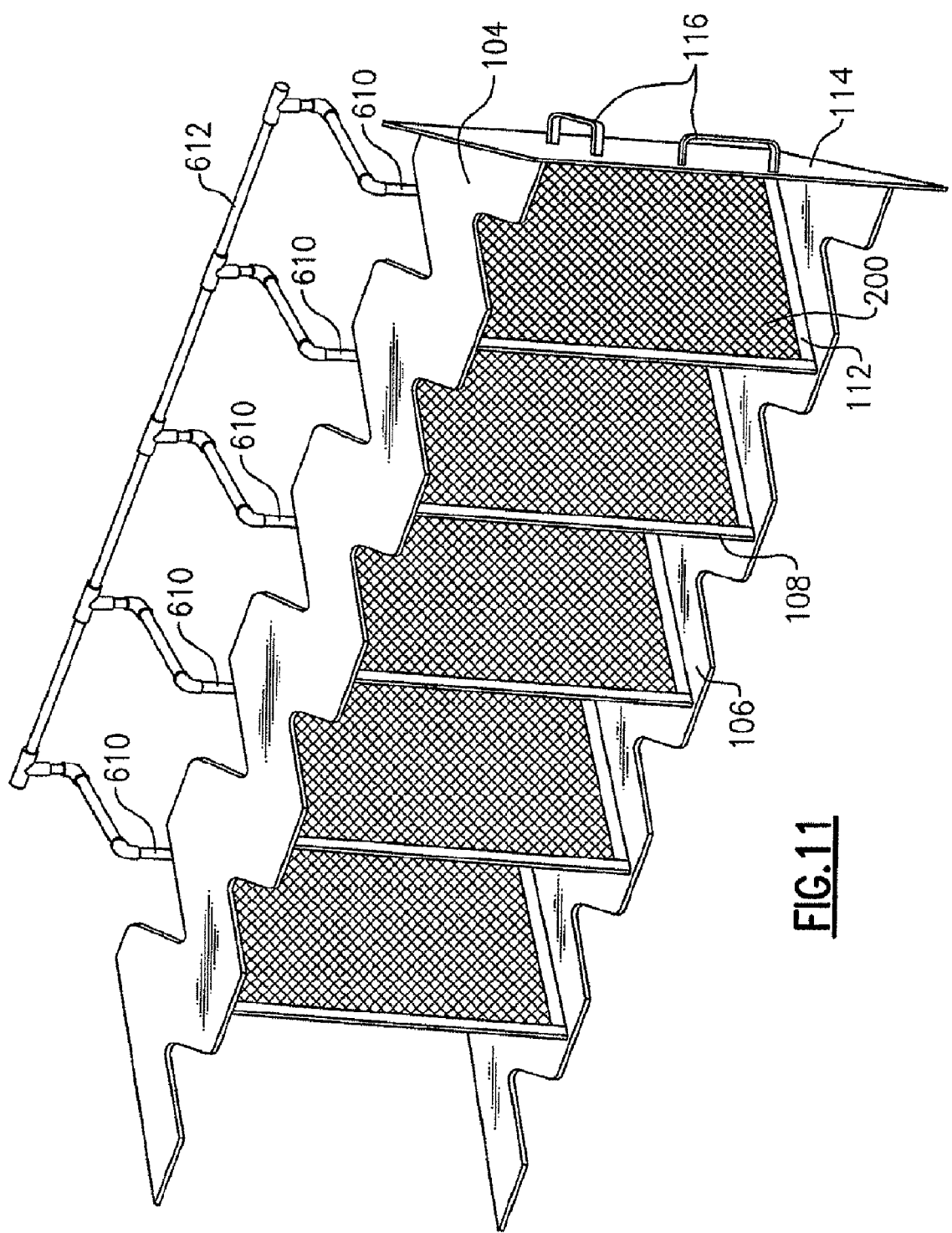
FIG. 11 is a perspective view of a second embodiment of the lint blowing system showing in relation to the lint screen frame assembly.
Figure 12:
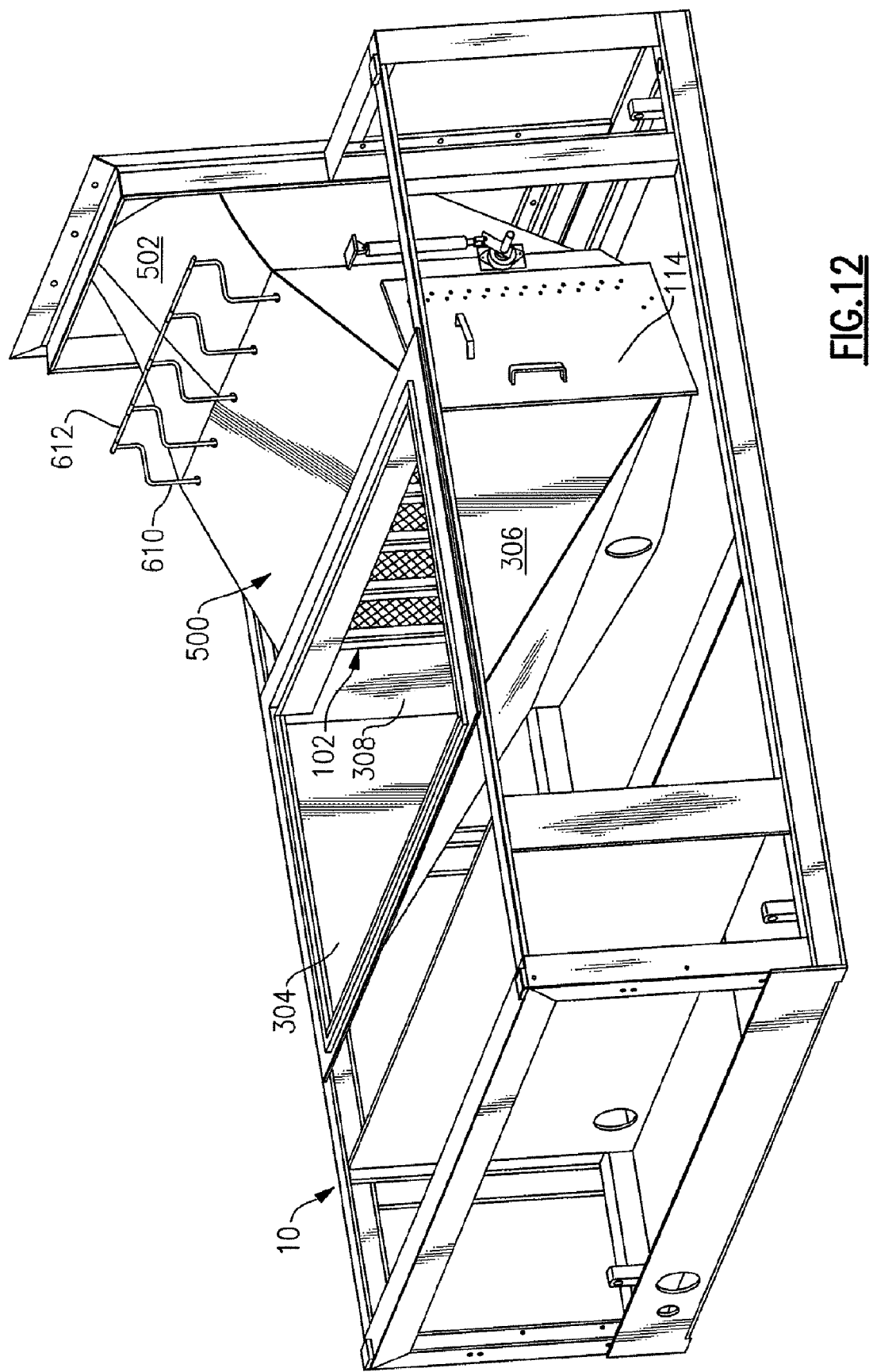
FIG. 12 is a perspective view of the lint collection system with the second embodiment of the lint blowing system.

In a second embodiment of the air blower system 600, as seen in FIGS. 11 and 12, a series of vertically extending lines 610 coming off of a horizontally extending distribution line 612 are each positioned downstream of a respective filter screen member 200, and include air ports formed along the lengths thereof. A compressed air source attached to distribution line 612 provides the high pressure bursts of air emitted from lines 610.

Finally, a pair of nozzles 612 are positioned on opposite sides of frame assembly 102 and are connected to a compressed air source. Nozzles 612 are slightly below lower plate 106 and the compressed air source is activated at the end of the drying cycle to blow the lint that has fallen off screen members 200 towards the middle of floor 311 (the inward sloping of floor 311 assists in this movement of lint). After the lint been blown towards the middle, the vacuum source connected to pipe 404 is activated, thereby pulling the lint therethrough to its ultimate disposal side (bin 400 or into the bin at the end distribution line 404).

What is claimed is:
1. An apparatus, comprising:
 a. a fabric drying unit containing a heater for heating air;
 b. a blower that when actuated directs said air heated by said heater predominantly along a predetermined vector; and c. a lint trap device, comprising:
  i. a frame having a plurality of lint filter retaining members; and
  ii. a plurality of lint filter members, wherein each of said plurality of lint filter members is securely positioned relative to a respective one of said plurality of lint filter retaining members, and further wherein said lint filter retaining members orient said plurality of lint filter members in respective planes that extend at oblique angles relative to the predetermined vector.

2. The apparatus according to claim 1, wherein each of said plurality of lint filter members comprises upper and lower lint filter frame members.

3. Apparatus according to claim 2, wherein said lint filter retaining members comprise respective sets of upper and lower channels adapted to receive respective ones of said upper and lower lint filter frame members.

4. Apparatus according to claim 1, further comprising a plurality of lint filter joining members interconnecting adjacent ones of said plurality of lint filter members.

5. The apparatus according to claim 4, wherein each of said plurality of lint filter members comprise an elongated nose member that interconnects adjacent ones of said plurality of lint filter members at their vertex.

* * * * *